US009467901B2

(12) United States Patent
Better et al.

(10) Patent No.: US 9,467,901 B2
(45) Date of Patent: Oct. 11, 2016

(54) PAGING A WIRELESS DEVICE USING A RADIO CELL IDENTIFIER

(71) Applicant: Telefonaktiebolaget L M Ericsson (publ), Stockholm (SE)

(72) Inventors: David Better, Taby (SE); Walter Muller, Upplands Vasby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/595,913

(22) Filed: Jan. 13, 2015

(65) Prior Publication Data

US 2015/0230200 A1   Aug. 13, 2015

(30) Foreign Application Priority Data

Feb. 10, 2014 (EP) .................................... 14154452

(51) Int. Cl.
  *H04W 68/00* (2009.01)
  *H04W 28/18* (2009.01)
  *H04W 68/08* (2009.01)

(52) U.S. Cl.
  CPC ............. *H04W 28/18* (2013.01); *H04W 68/08* (2013.01)

(58) Field of Classification Search
  CPC . H04W 68/005; H04W 68/04; H04W 68/08; H04W 28/18
  USPC ........................................................ 455/438
  See application file for complete search history.

(56) References Cited

U.S. PATENT DOCUMENTS

2012/0295643 A1   11/2012  Arvidsson et al.
2014/0187283 A1 *  7/2014  Nimbalker .......... H04W 72/048
                                             455/550.1

FOREIGN PATENT DOCUMENTS

| CN | 102118732 A | * | 7/2011 | |
| EP | 1251705 A2 | | 10/2002 | |
| JP | EP 1251705 A2 | * | 10/2002 | ............ H04W 68/06 |
| WO | WO-98/59516 A1 | | 12/1998 | |
| WO | WO-2012/177279 A1 | | 12/2012 | |

OTHER PUBLICATIONS

*Extended European Search Report of Counterpart European Application No. 14154452.8*, (Jul. 31, 2014), 6 pages.
"RG20—Precise Paging", *Telecominfo, Telecomsource Forum*, retreivied from http://www.telecomsource.net/showthread.php?3324-RG20-Precise-Paging on Jul. 24, 2014, (Sep. 8, 2012), 5 pages.

* cited by examiner

*Primary Examiner* — Tanmay Shah
(74) *Attorney, Agent, or Firm* — Nicholson De Vos Webster & Elliott, LLP (57) ABSTRACT

According to a first aspect, it is presented a method for paging a particular wireless device. The method is performed in a radio base station and comprises the operations of: receiving a paging request from a core network node to page the particular wireless device, the paging request comprising a temporary identifier of the particular wireless device; obtaining at least one radio cell identifier for the particular wireless device from a database mapping temporary identifiers of the wireless device with radio cell identifiers; paging the particular wireless device using the at least one radio cell identifier for the particular wireless device; and determining the paging to be successful when a connection request comprising the temporary identifier is received from the particular wireless device.

13 Claims, 4 Drawing Sheets

PAGING A WIRELESS DEVICE USING A RADIO CELL IDENTIFIER

CROSS-REFERENCE TO RELATED APPLICATIONS

This application claims the benefit of EP Application No. 14154452.8, filed Feb. 10, 2014, which is hereby incorporated by reference.

TECHNICAL FIELD

The invention relates to paging, and more particularly to paging a wireless device using a radio cell identifier.

BACKGROUND

In cellular networks, the network sometimes need to get in contact with a wireless device which is not currently connected to the network. In order to get hold of the wireless device, paging is used to request the wireless device to perform a connection request to the network. This starts a connection procedure, and when the wireless device is connected to the network, it becomes available to receive an incoming call and/or to receive data.

For the paging to occur, e.g. in LTE (Long Term Evolution), the MME (Mobility Management Entity) in the core network sends an S1-AP paging message to one or more radio base stations. The radio base station(s) then creates and sends an RRC (Radio Resource Control) page message over the air.

In the prior art, paging is directed to a plurality of cells, e.g. a tracking area comprising a number of cells, to improve the chance of directly making a wireless device connect to the network.

US2012/0295643 presents selectively paging a user equipment (UE) in a plurality of cells in which the UE is estimated to be located. A method is presented which comprises: determining, for the plurality of cells, the number of observations that is made of the UE in each of a number of sets of cells among said plurality of cells; determining a paging sequence for the UE in the plurality of cells based on said determined number of observations in each of said sets of cells; and enabling paging of the UE in the plurality of cells according to the determined paging sequence. However, the presented procedure is relatively complicated and would benefit from simplification, while keeping security high.

SUMMARY

According to a first aspect, it is presented a method for paging a particular wireless device. The method is performed in a radio base station and comprises the operations of: receiving a paging request from a core network node to page the particular wireless device, the paging request comprising a temporary identifier of the particular wireless device; obtaining at least one radio cell identifier for the particular wireless device from a database mapping temporary identifiers of the wireless device with of radio cell identifiers; paging the particular wireless device using the at least one radio cell identifier for the particular wireless device; and determining the paging to be successful when a connection request comprising the temporary identifier is received from the particular wireless device.

Paging in more cells than necessary wastes resources. LTE networks typically provide smaller and a greater number of radio cells. With such great number of cells, the problem of paging is aggravated compared to earlier mobile communication systems. By using the database mapping temporary identifiers of the wireless device with radio cell identifiers, the permanent identifier, such as IMSI (International Mobile Subscriber Identity) or phone number does not need to be revealed to the radio base station. This is a strong security feature, whereby if the security of a radio base station, which is in the field, would be compromised, the risk is minimal that a violator is able to tap data of a specific user.

The method may further comprise the operation of: paging in an extended area when no connection request comprising the temporary identifier is received from the particular wireless device within a time-out period, the extended area comprising other radio cells with other radio cell identifiers than the at least one radio cell identifier for the particular wireless device. This improves the likelihood of a successful page, while keeping the original page limited in coverage and therefore also limits initial resource use.

The operation of paging in an extended area may comprise paging all radio cells of the radio base station.

The operation of paging in an extended area may comprise sending a request to a neighbouring radio base station to page the particular wireless device.

The method may further comprise the operation of: sending a release message to the core network node when the particular wireless device is to be or has been disconnected, the release message comprising a temporary association to the wireless device and a radio cell identifier of the last radio cell of the particular wireless device.

In the operation of receiving a paging request, the paging request may comprise a priority indicator, in which case the operation of paging comprises paging the particular wireless device in all radio cells of the radio base station when the priority indicator indicates a high priority.

The operation of obtaining at least one radio cell identifier may comprise extracting the at least one radio cell identifier from the paging request.

According to a second aspect, it is presented a radio base station comprising: a processor; and a memory storing instructions. The instructions, when executed by the processor, causes the radio base station to: receive a paging request from a core network node to page a particular wireless device, the paging request comprising a temporary identifier of the particular wireless device; obtain at least one radio cell identifier for the particular wireless device from a database mapping temporary identifiers of the wireless device with radio cell identifiers; page the particular wireless device using the at least one radio cell identifier for the particular wireless device; and determine the paging to be successful when a connection request comprising the temporary identifier is received from the particular wireless device.

The radio base station may further comprise instructions that, when executed by the processor, causes the radio base station to page in an extended area when no connection request comprising the temporary identifier is received from the particular wireless device within a time-out period. The extended area comprises other radio cells with other radio cell identifiers than the at least one radio cell identifier for the particular wireless device.

The instructions to page in an extended area may comprise instructions that, when executed by the processor, causes the radio base station to page all radio cells of the radio base station.

The instructions to page in an extended area may comprise instructions that, when executed by the processor, causes the radio base station to send a request to a neighbouring radio base station to page the particular wireless device.

The radio base station may further comprise instructions that, when executed by the processor, causes the radio base station to send a release message to the core network node when the particular wireless device is to be or has been disconnected. The release message comprises a temporary association to the wireless device and a radio cell identifier of the last radio cell of the particular wireless device.

The paging request may comprise a priority indicator; and the instructions to page may comprise instructions that, when executed by the processor, causes the radio base station to page the particular wireless device in all radio cells of the radio base station when the priority indicator indicates a high priority.

The instruction to obtain at least one radio cell identifier may comprise instructions that, when executed by the processor, causes the radio base station to extract the at least one radio cell identifier from the paging request.

According to a third aspect, it is presented a computer program for paging a particular wireless device. The computer program comprises computer program code which, when run on the radio base station causes the radio base station to: receive a paging request from a core network node to page a particular wireless device, the paging request comprising a temporary identifier of the particular wireless device; obtain at least one radio cell identifier for the particular wireless device from a database mapping temporary identifiers of the wireless device with radio cell identifiers; page the particular wireless device using the at least one radio cell identifier for the particular wireless device; and determine the paging to be successful when a connection request comprising the temporary identifier is received from the particular wireless device.

According to a fourth aspect, it is presented a computer program product comprising a computer program according to claim 15 and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, operation, etc." are to be interpreted openly as referring to at least one instance of the element, apparatus, component, means, step, operation, etc., unless explicitly stated otherwise. The steps and/or operations of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
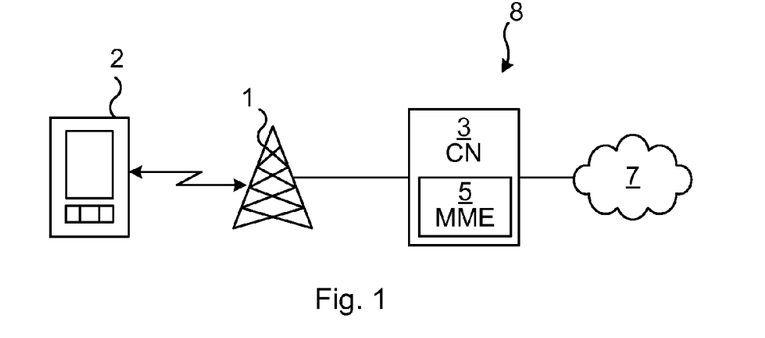
FIG. 1 is a schematic diagram illustrating a cellular network where embodiments presented herein may be applied.

FIG. 1 is a schematic diagram illustrating a cellular network 8 where embodiments presented herein may be applied. The cellular network 8 comprises a core network 3 and one or more radio base stations 1. The radio base stations 1 are here in the form of evolved Node Bs, also known as eNode Bs or eNBs. The radio base station 1 could also be in the form of Node Bs, BTSs (Base Transceiver Stations) and/or BSSs (Base Station Subsystems), etc. The radio base station 1 provides radio connectivity to a plurality of wireless devices 2 via one or more radio cells per radio base station 1. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Communication between the wireless device 2 and the radio base station 1 occurs over a wireless radio interface in a radio cell (see 4a-f of FIGS. 2A-B) of a radio base station 1, where uplink (UL) communication occurs from the wireless device 2 to the radio base station 1 and downlink (DL) communication occurs from the radio base station 1 to the wireless device 2. The quality of the wireless radio interface to each wireless device 2 can vary over time and depends on the position of the wireless device 2, due to effects such as fading, interference, multipath propagation, etc.

The radio base station 1 is also connected to the core network 3 for connectivity to central functions such as an MME 5 and a wide area network 7, such as the Internet. The MME 5 is a network node within the core network 3 which is a control node that processes signaling between the wireless device and the core network 3. The main functions of the MME are related to connection management and bearer management, which e.g. can be handled via Non Access Stratum (NAS) protocols. Other components of the core network 3 are omitted in this description in order not to obscure the concepts of embodiments presented herein.

Figure 2A:
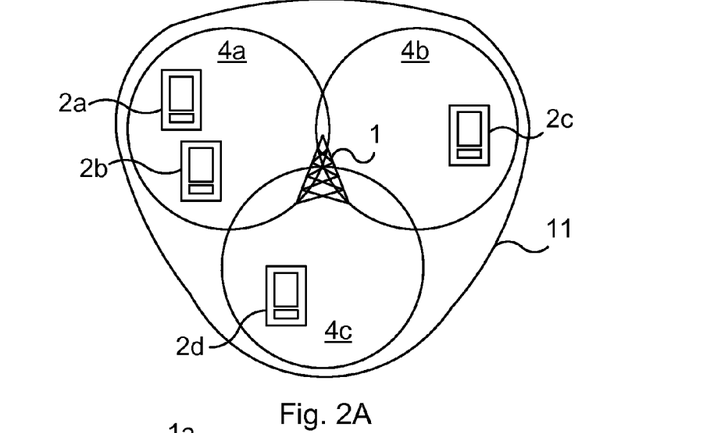
FIGS. 2A-B are schematic diagrams illustrating where paging of wireless devices of FIG. 1 can occur in cells of radio base stations of FIG. 1.
Figure 2B:
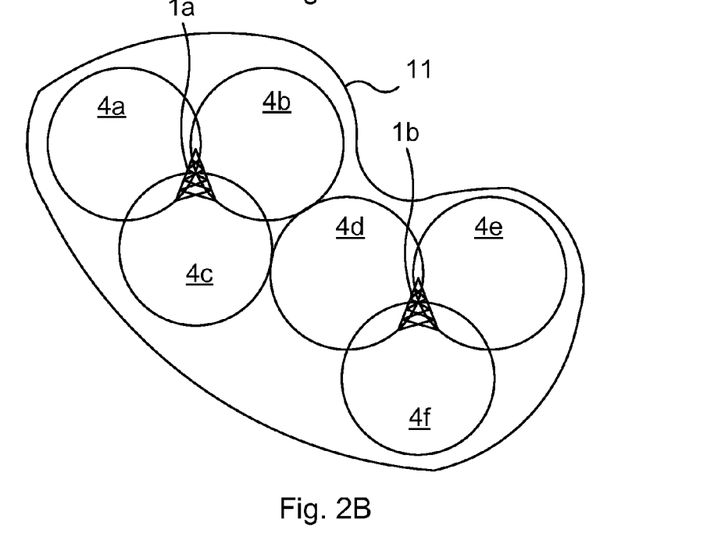

FIGS. 2A-B are schematic diagrams illustrating where paging of wireless devices of FIG. 1 can occur in cells of radio base stations of FIG. 1. Looking first to the example shown in FIG. 2A, it is here shown a radio base station 1 having a first radio cell 4a, a second radio cell 4b and a third radio cell 4c. In the first radio cell 4a there is a first wireless device 2a and a second wireless device 2b. In the second radio cell 4b there is a third wireless device 2c. In the third radio cell 4c there is a fourth wireless device 2d.

When the network needs to connect with a wireless device that is not connected to the network, a page needs to be sent out. According to the methods presented below, the page is first sent out in a subset of the radio cells 4a-c of the radio base station. For example, if the first wireless device 2a is to be paged and this was last seen in the first radio cell 4a, the page is first sent in the first radio cell 4a. In this way, the page does not need to consume resources of the second radio cell 4b or the third radio cell 4c.

On the other hand, if the fourth wireless device 2d is to be paged and this was last seen in the second radio cell 4b, paging is first attempted in the second radio cell 4b. But since the last time it was seen, fourth wireless device 2d has moved and is not there anymore, whereby the paging is not successful. When the radio base station 1 does not receive any connection request from the fourth wireless device 2d within a certain time period (t0 below), the radio base station 1 then pages in an extended paging area 11, e.g. all cells of the radio base station 1, at which point the fourth wireless device 2d receives the page and connects to the network.

In FIG. 2B, it is shown an example where the extended paging area 11 comprises the radio cells 4a-f of several, in this example two, radio base stations 1a-b.

Figure 3A:
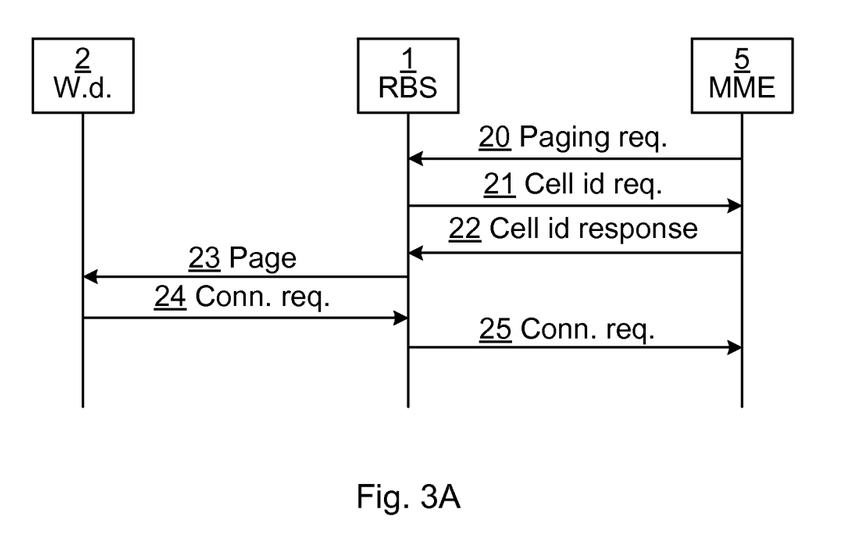
FIG. 3A-B are sequence diagrams illustrating communication between the MME, the radio base station and the wireless device of FIG. 1 for paging the wireless device.
Figure 3B:
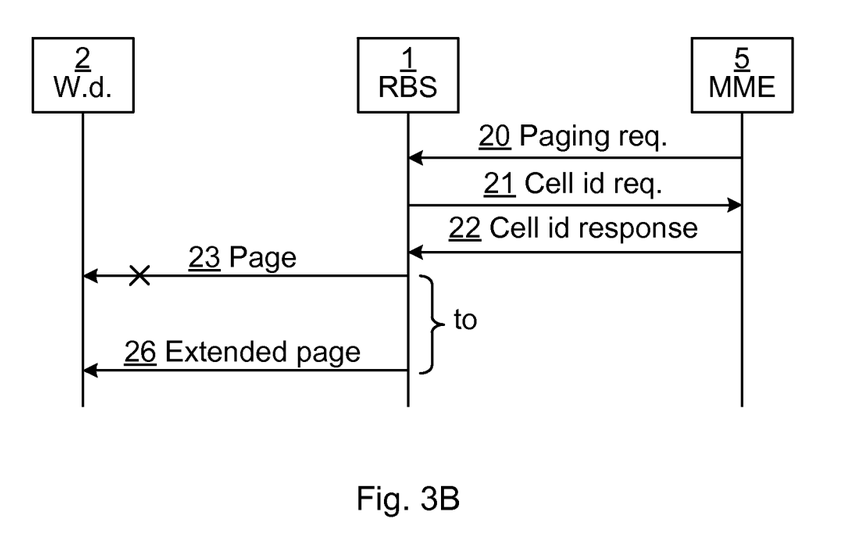

FIG. 3A-B are sequence diagrams illustrating communication between the MME 5, the radio base station 1 and the wireless device 2 of FIG. 1 for paging the wireless device 2.

Looking first to FIG. 3A, the MME 5 first sends a paging request 20 to the radio base station 1, e.g. in form of an S1-AP paging message. The paging request 20 comprises a temporary identifier of the wireless device, such as a S-TMSI (System Architecture Evolution-Temporary Mobile Subscriber Identity). The S-TMSI is a temporary unique identifier assigned to the wireless device by the MME in order to identify the wireless device context while supporting subscriber identity confidentiality. In this way, the radio base station can use the S-TMSI without violating the integrity of the wireless device. The radio base station then does not know the permanent identity of the wireless device. This is a strong security feature, whereby if the security of a radio base station, which is in the field, would be compromised, the risk of tapping data of a desired user is minimal. The data is only associated with a temporary identifier of a wireless terminal which a violator can not translate to any meaningful identifier without also gaining control over the MME, which is much more difficult.

The RBS 1 then sends a cell id request 21 comprising the temporary identifier to the MME 5, which responds with a cell id response 22 to the radio base station, containing the identifier(s) of the radio cell (or radio cells) associated with the temporary identifier of the wireless device. The identifier(s) of the cell can e.g. be a Cell Global Identifier (CGI). The term cell ID is also used herein to denote an identifier of a radio cell.

Alternatively, the cell id request 21 and the cell id response 22 are omitted and the RBS 1 instead obtains the identifier(s) of the radio cell (or radio cells) associated with the temporary identifier of the wireless device from a local database.

The radio base station 1 then pages 23 the wireless device 2 in the radio cell or radio cells identified by the cell id(s) from the cell id response 22.

When the wireless device 2 receives the page 23, it responds with a connection request 24. The connection request 24 can e.g. be a RrcConnectionRequest message, containing the S-TMSI of the wireless device.

The radio base station 1 then proceeds with the connection procedure by sending a connection request 25 to the MME, as known per se.

The scenario of FIG. 3B is slightly different after the page 23. Here, the wireless device does not receive the page 23 (as indicated by the cross on the page 23), e.g. due to being out of the area of the radio cell used for paging. When the radio base station 1 does not receive a connection request with the temporary identifier of the wireless device 2 within a time period t0, the radio base station extends the paging to an extended paging area (see 11 of FIGS. 2A-B) in an extended page 26 to more radio cells to improve the chances of reaching the wireless device 2.

Figure 4A:
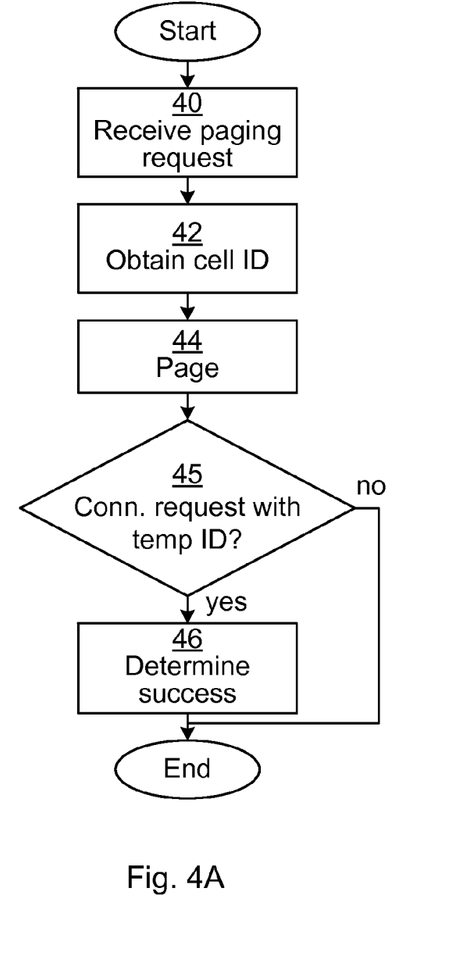
FIGS. 4A-B are flow charts illustrating embodiments of methods performed in the radio base station of FIG. 1 device for paging a particular wireless device.
Figure 4B:
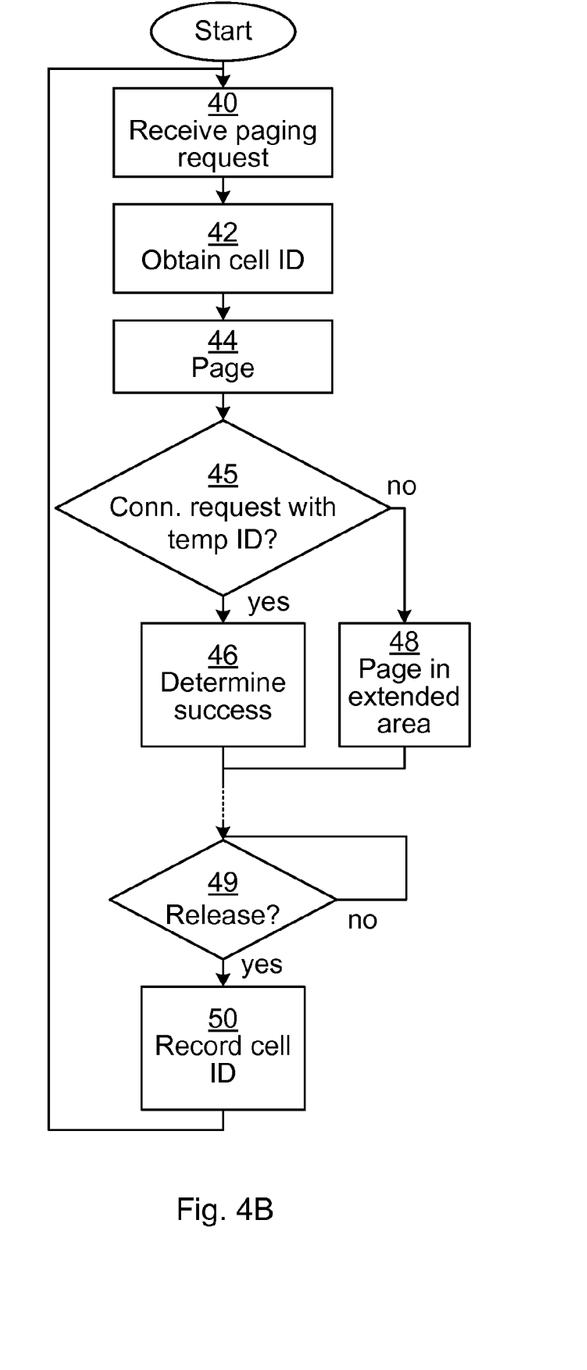

FIGS. 4A-B are flow charts illustrating methods performed in the radio base station 1 of FIG. 1 for paging a particular wireless device. The methods may be performed in parallel for a plurality of wireless devices but each instance of the method is performed for a particular wireless device. First, the method illustrated in the flow chart of FIG. 4A will be described.

In a receive paging request operation 40, a paging request (see 20 of FIGS. 3A-B) is received from a core network node, such as the MME, to page the particular wireless device. The paging request can e.g. be a S1-AP paging message. The paging request comprises a temporary identifier of the particular wireless device, such as the S-TMSI. Optionally, the paging request comprises a cell identifier (or optionally plurality of cell identifiers) associated with the wireless device.

In an obtain cell ID operation 42, at least one radio cell identifier for the particular wireless device is obtained from a database mapping temporary identifiers of the wireless device with radio cell identifiers.

In one embodiment, the database is located in the core network, whereby the radio base station then queries (see 21 and 22 of FIGS. 3A-B) the centrally located database for the identifier of the radio cells for the wireless device.

In one embodiment, the database is located in or by the radio base station, whereby only a local query to the database is necessary to obtain the identifier of the radio cells for the wireless device.

In other words, the radio base station would then keep track of all previous temporary identifiers in a big array/hash-table/other data structure. This storage would then need to be updated as soon as wireless devices are released.

In one embodiment, the database stores the last known cell of the wireless device, keyed by the temporary identifier. In such a case, the cell identifier of this last known cell is obtained in this operation.

Optionally, the paging request comprises a priority indicator indicating how important the paging is. Such elevated priority can e.g. occur due to fall back to CS (Circuit Switched) or other time critical procedures.

In a page operation 44, the particular wireless device is paged (see 23 of FIGS. 3A-B) using the at least one radio cell identifier for the particular wireless device.

When the priority indicator is received in the paging request, and this priority indicator indicates a high priority, the paging of the particular wireless device can e.g. occur in all radio cells of the radio base station to improve the chance of quickly reaching the particular wireless device, at the expense of using more resources.

In a conditional connection request with temporary ID operation 45, it is determined when a connection request (see 24 of FIG. 3A) comprising the temporary identifier has been received from the particular wireless device. If a connection request comprising the temporary identifier is received from the particular wireless device within a time-out period $t_0$, the method continues to the determine success operation 46. Otherwise, the method ends. The time-out period $t_0$ is optionally configurable.

In the determine success operation 46, since the connection request from the wireless device has been received with the temporary ID, the paging is determined to be successful.

The method illustrated in FIG. 4B is similar to the method illustrated in FIG. 4A and the operations of FIG. 4A will not be described again. FIG. 4B includes optional operations related to extending the cell paging and recording cell information when a release of the wireless device occurs.

Here, if the conditional connection request with temporary ID operation 45 results in a negative determination, the method proceeds to a page in extended area operation 48.

The page in extended area operation 48 occurs when the paging in the identifiers of the cells obtained in the obtain cell id operation 42 was not successful. An extended page (see 26 of FIG. 3B) is then sent, extending the paging to a larger area (see 11 of FIGS. 2A-B) to increase the likelihood of successfully paging the wireless device. The extended area comprises other radio cells with other radio cell identifiers than the at least one radio cell identifier for the particular wireless device. The extended are can, but does not need to, comprise the radio cells with the radio cell identifier for the particular wireless device.

In one embodiment, the extended area comprises all radio cells of the radio base station. In one embodiment, this operation comprises sending a request to a neighbouring radio base station to page the particular wireless device in the radio cells of the neighbouring radio base station (see FIG. 2B).

In an optional conditional release operation 49, it is determined whether the particular wireless device is to be, or has been, disconnected. If this is the case, the method proceeds to a record cell ID 50. Otherwise, the method re-executes the conditional release operation 49.

In an optional record cell ID operation 50, the last cell ID of the wireless device is recorded. In one embodiment, a release message is sent to the core network node, e.g. the MME. The release message comprises a temporary association to the wireless device and a radio cell identifier of the last radio cell of the particular wireless device.

One possibility is to append the radio cell identifier to the already existing messages: UE_CONTEXT_RELEASE_COMPLETE (for MME initiated releases) and UE_CONTEXT_RELEASE_REQ (radio base station initiated releases).

In one embodiment, this operation comprises recording the last cell ID of the wireless device in local storage of the radio base station, as explained above.

It should be noted that some S1-AP pages do not contain the temporary identifier, such as S-TMSI, but rather IMSI (International Mobile Subscriber Identity). For those cases it is unlikely that any prior information on the location of the wireless device is known. In such cases, the radio base station can either page the wireless device in sequence over all cells or just page the wireless device in all cells in parallel. The in sequence approach can be made more intelligent by first paging in the cell with the largest population of connected wireless devices and then continue in order of decreasing number of connected wireless devices. This is a simple scheme that should improve the chance of finding the UE with a lower number of pages.

The methods presented above provide a significantly more efficient paging. A scenario for indicating quantitatively this efficiency will now be presented. The likelihood of a wireless device to be found in the same radio cell as it was released in (P_hit) is assumed to be 50%. Furthermore, 95% of all pages are assumed to be S-TMSI pages and not IMSI pages (this number is measured from live networks), i.e. the portion of IMSI pages (P_stmsi) is 95%. The number of cells per radio base station (#cells) is assumed to be six.

Formula (1) is then used to calculate the paging reduction factor:

$$\text{Paging reduction factor} = \#cells/(\#cells*(1-P\_stmsi) + P\_stmsi*P\_hit + (\#cells-1)*P\_stmsi*(1-P\_hit)) = 6/(6*(1-0.95) + 0.95*0.5 + (6-1)*0.95*(1-0.5)) = 1.905$$

This means that the paging load with this invention will reduce the paging load by a factor of about 1.9. For more cells per radio base station and/or a higher P_hit, the paging reduction factor increases rapidly.

Figure 5:
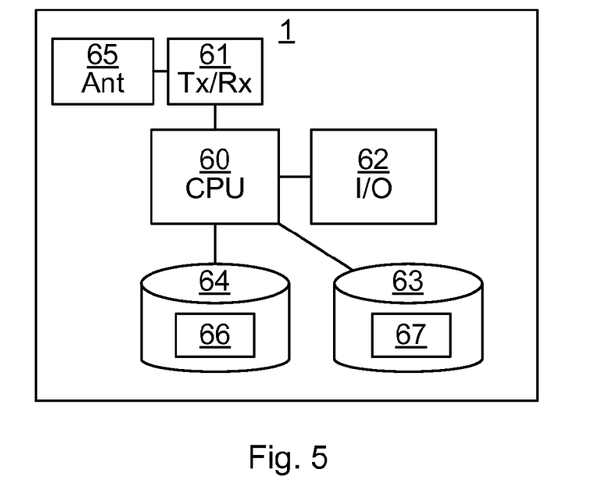
FIG. 5 is a schematic diagram showing some components of the wireless device of FIG. 1.

FIG. 5 is a schematic diagram showing some components of the radio base station 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the methods described with reference to FIGS. 4A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM). The data memory can e.g. comprise information 67 about what cell a particular wireless device was last seen in.

The radio base station 1 further comprises an I/O interface 62 for communicating with other external entities, such as the core network or other radio base stations 1, e.g. over an X2 interface, to extend a paging area to neighbouring radio base stations. The I/O interface 62 optionally also includes a user interface including one or more of a display, keys, pointer device, speaker, etc.

The radio base station 1 also comprises one or more transceivers 61, comprising analogue and digital components, and a suitable number of antennas 65 for wireless communication with wireless devices 2 as shown in FIG. 1.

Other components of the radio base station 1 are omitted in order not to obscure the concepts presented herein.

Figure 6:
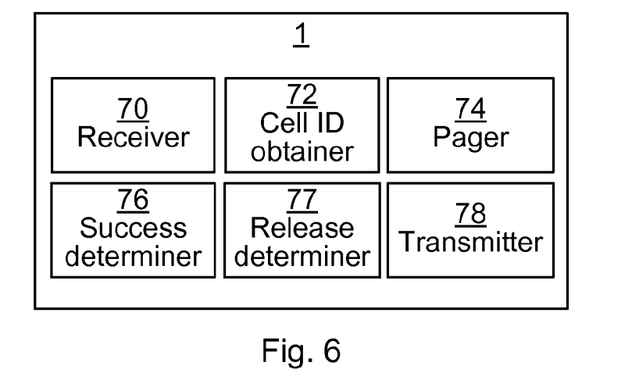
FIG. 6 is a schematic diagram showing functional modules of the radio base station of FIGS. 1 and 5.

FIG. 6 is a schematic diagram showing functional modules of the radio base station 1 of FIG. 1 and FIG. 5. The modules can be implemented using software instructions such as a computer program executing in the radio base station 1 and/or using hardware, such as application specific integrated circuits, field programmable gate arrays, discrete logical components, etc. The modules correspond to the operations in the methods illustrated in FIGS. 4A-B.

A receiver 70 is arranged to receive a paging request from a core network node to page a particular wireless device, the paging request comprising a temporary identifier of the particular wireless device. This module corresponds to the receive paging request operation 40 of FIGS. 4A-B.

A cell ID obtainer 72 is arranged to obtain at least one radio cell identifier for the particular wireless device from a database mapping temporary identifiers of the wireless device with radio cell identifiers. This module corresponds to the obtain cell ID operation of FIGS. 4A-B.

A pager 74 is arranged to page the particular wireless device using the at least one radio cell identifier for the particular wireless device. Optionally, the pager is also arranged to page in an extended area when no connection request comprising the temporary identifier is received from the particular wireless device within a time-out period. This module corresponds to the page operation 44 of FIGS. 4A-B and the page in extended area operation 48 of FIG. 4B.

A success determiner 76 is arranged to determine the paging to be successful when a connection request comprising the temporary identifier is received from the particular wireless device. This module corresponds to the conditional connection request with temporary ID operation 45 and the determine success operation 46 of FIGS. 4A-B.

A release determiner 77 is arranged to determine when the particular wireless device is to be or has been disconnected. This module corresponds to the conditional release operation 49 of FIG. 4B.

A transmitter 78 is arranged to send a release message to the core network node, the release message comprising a temporary association to the wireless device and a radio cell identifier of the last radio cell of the particular wireless device. This module corresponds to the send release message operation 50 of FIG. 50.

Figure 7:
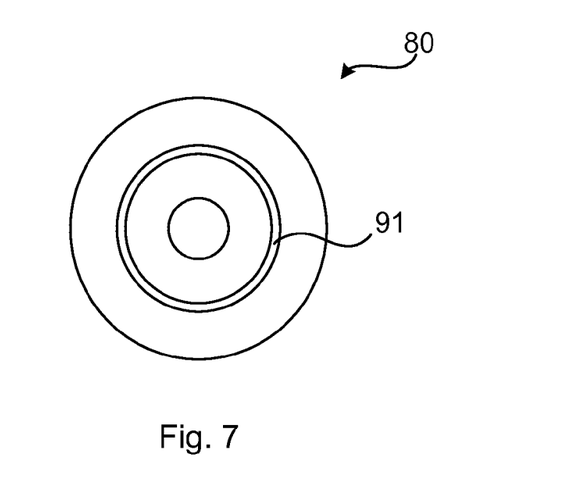
FIG. 7 shows one example of a computer program product comprising computer readable means.

FIG. 7 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc, but the computer program product can also be a solid state memory such as a USB (Universal Serial Bus) memory stick. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for paging a particular wireless device, the method being performed in a radio base station and comprising operations of:
   receiving a paging request from a core network node to page the particular wireless device, the paging request comprising a temporary identifier of the particular wireless device;
   obtaining at least one radio cell identifier for the particular wireless device from a database mapping temporary identifiers of the wireless device with radio cell identifiers;
   paging the particular wireless device using the at least one radio cell identifier for the particular wireless device;
   determining the paging to be successful when a connection request comprising the temporary identifier is received from the particular wireless device; and
   sending a release message to the core network node when the particular wireless device is to be or has been disconnected, the release message including a temporary association to the particular wireless device and a radio cell identifier of a last radio cell of the particular wireless device.

2. The method according to claim 1, further comprising an operation of:
   paging in an extended area when no connection request comprising the temporary identifier is received from the particular wireless device within a time-out period, the extended area comprising other radio cells with other radio cell identifiers than the at least one radio cell identifier for the particular wireless device.

3. The method of claim 2, wherein the operation of paging in the extended area comprises paging all radio cells of the radio base station.

4. The method according to claim 2, wherein the operation of paging in the extended area comprises sending a request to a neighbouring radio base station to page the particular wireless device.

5. The method according to claim 1, wherein in the operation of receiving the paging request, the paging request comprising a priority indicator; and
   wherein the operation of paging comprises paging the particular wireless device in all radio cells of the radio base station when the priority indicator indicates a high priority.

6. The method according to claim 1, wherein the operation of obtaining at least one radio cell identifier comprises querying the core network node.

7. A radio base station comprising:
   a processor; and
   a memory storing instructions that, when executed by the processor, causes the radio base station to:
   receive a paging request from a core network node to page a particular wireless device, the paging request comprising a temporary identifier of the particular wireless device;
   obtain at least one radio cell identifier for the particular wireless device from a database mapping temporary identifiers of the wireless device with radio cell identifiers;
   page the particular wireless device using the at least one radio cell identifier for the particular wireless device;
   determine the paging to be successful when a connection request comprising the temporary identifier is received from the particular wireless device; and
   send a release message to the core network node when the particular wireless device is to be or has been disconnected, the release message comprising a temporary association to the particular wireless device and a radio cell identifier of the last radio cell of the particular wireless device.

8. The radio base station according to claim 7, wherein the instructions, when executed by the processor, further causes the radio base station to page in an extended area when no connection request comprising the temporary identifier is received from the particular wireless device within a timeout period, the extended area comprising other radio cells with other radio cell identifiers than the at least one radio cell identifier for the particular wireless device.

9. The radio base station of claim 8, wherein the instructions to page in the extended area comprise instructions that, when executed by the processor, causes the radio base station to page all radio cells of the radio base station.

10. The radio base station according to claim 8, wherein the instructions to page in the extended area comprise instructions that, when executed by the processor, causes the radio base station to send a request to a neighbouring radio base station to page the particular wireless device.

11. The radio base station according to claim 8, wherein the paging request comprising a priority indicator; and wherein the instructions to page comprise instructions that, when executed by the processor, causes the radio base station to page the particular wireless device in all radio cells of the radio base station when the priority indicator indicates a high priority.

12. The radio base station according to claim 7, wherein the instruction to obtain at least one radio cell identifier comprise instructions that, when executed by the processor, causes the radio base station to query the core network node.

13. A non-transitory computer-readable storage medium having computer code stored therein, which when executed by a processor of a radio base station, causes the radio base station to:
- receive a paging request from a core network node to page a particular wireless device, the paging request comprising a temporary identifier of the particular wireless device;
- obtain at least one radio cell identifier for the particular wireless device from a database mapping temporary identifiers of the wireless device with radio cell identifiers;
- page the particular wireless device using the at least one radio cell identifier for the particular wireless device;
- determine the paging to be successful when a connection request comprising the temporary identifier is received from the particular wireless device; and
- send a release message to the core network node when the particular wireless device is to be or has been disconnected, the release message including a temporary association to the particular wireless device and a radio cell identifier of a last radio cell of the particular wireless device.

* * * * *